(12) United States Patent
Zhan

(10) Patent No.: US 11,881,971 B2
(45) Date of Patent: Jan. 23, 2024

(54) ADAPTIVE PAM4 DECISION FEEDBACK EQUALIZATION CIRCUIT

(71) Applicant: INSPUR SUZHOU INTELLIGENT TECHNOLOGY CO., LTD., Jiangsu (CN)

(72) Inventor: Yongzheng Zhan, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/232,935

(22) Filed: Aug. 11, 2023

(65) Prior Publication Data

US 2023/0396467 A1 Dec. 7, 2023

Related U.S. Application Data

(63) Continuation of application No. PCT/CN2022/074065, filed on Jan. 26, 2022.

(30) Foreign Application Priority Data

Sep. 30, 2021 (CN) ............................ 202111158691.4

(51) Int. Cl.
 *H04L 25/03* (2006.01)
 *H04B 10/54* (2013.01)

(52) U.S. Cl.
 CPC ..... *H04L 25/03267* (2013.01); *H04B 10/541* (2013.01); *H04L 25/03286* (2013.01)

(58) Field of Classification Search
 CPC ........ H04L 25/03267; H04L 25/03286; H04B 10/541

(Continued)

(56) References Cited

U.S. PATENT DOCUMENTS 8,873,615 B2 * 10/2014 Hui .................. H04L 25/03044
 375/350
2004/0066755 A1 * 4/2004 Lin ...................... H04L 25/022
 370/252

(Continued)

FOREIGN PATENT DOCUMENTS

CN 1287413 A 3/2001
CN 101009672 A 8/2007

(Continued)

OTHER PUBLICATIONS

International Search Report of PCT/CN2022/074065, dated Jun. 9, 2022.

(Continued)

*Primary Examiner* — Don N Vo
(74) *Attorney, Agent, or Firm* — Cooper Legal Group LLC

(57) ABSTRACT

The present application relates to an adaptive PAM4 decision feedback equalization circuit, including a decision feedback equalization main circuit and an adaptive circuit. The main circuit includes an adder, a first decision device, a second decision device, a third decision device, a first delay unit group, a second delay unit group, a third delay unit group, a decoder, and a DSP coefficient table; the adaptive circuit includes an eye pattern monitoring module and an adaptive module; and the adaptive module includes a comparison unit, a delay unit, and a coefficient regulation and control unit.

20 Claims, 2 Drawing Sheets

(58) Field of Classification Search
USPC .......................................................... 375/233
See application file for complete search history.

(56) References Cited

U.S. PATENT DOCUMENTS

| | | | |
|---|---|---|---|
| 2007/0058710 | A1 | 3/2007 | Chang |
| 2007/0210583 | A1* | 9/2007 | Stahlhut .................... H02P 9/04 290/52 |
| 2009/0060021 | A1 | 3/2009 | Bulzacchelli |
| 2015/0256363 | A1 | 9/2015 | Shvydun et al. |
| 2017/0170995 | A1 | 6/2017 | Baecher et al. |
| 2019/0173586 | A1* | 6/2019 | Cevrero .............. H04L 25/4975 |

FOREIGN PATENT DOCUMENTS

| | | |
|---|---|---|
| CN | 101098416 A | 1/2008 |
| CN | 101106386 A | 1/2008 |
| CN | 107534629 A | 1/2018 |
| CN | 109831257 A | 5/2019 |
| CN | 110830400 A | 2/2020 |
| CN | 111294297 A | 6/2020 |
| CN | 112737570 A | 4/2021 |
| CN | 112825514 A | 5/2021 |
| CN | 112910565 A | 6/2021 |
| CN | 113595949 A | 11/2021 |

OTHER PUBLICATIONS

Written Opinion of International Searching Authority of PCT/CN2022/074065, dated Jun. 9, 2022.
Corresponding Chinese Patent Application No. 202111158691.4 First Office Action, dated Nov. 12, 2021.
Corresponding Chinese Patent Application No. 202111158691.4, Notification for Grant, dated Nov. 30, 2021.
Al-Taee, Alaa R., et al., "Two-Dimensional Eye-Opening Monitor for Serial Links", 2013 IEEE 56th International Midwest Symposium on Circuits and Systems (MWSCAS), Aug. 4, 2013, pp. 181-184.
Shujian Luo, Study and Implementation of Adaptive Channel Equalization Algorithm for Wireless Communication System, «China Doctor/Master Dissertations Full-text Database (Master's)-Information Technology volume»—non-official translation, Full text with English abstract, Mar. 15, 2016.

* cited by examiner

ADAPTIVE PAM4 DECISION FEEDBACK EQUALIZATION CIRCUIT

CROSS-REFERENCE TO RELATED APPLICATIONS

This application is a continuation of and claims priority to International Patent Application No. PCT/CN2022/074065, filed on Jan. 26, 2022, which claims priority to Chinese Patent Application No. 202111158691.4, entitled "ADAPTIVE PAM4 DECISION FEEDBACK EQUALIZATION CIRCUIT" and filed to China National Intellectual Property Administration on Sep. 30, 2021. International Patent Application No. PCT/CN2022/074065 and Chinese Patent Application No. 202111158691.4 are incorporated herein in their entireties by reference.

FIELD

The present application relates to the technical field of chiplet high-speed interface chip design, in particular to an adaptive PAM4 decision feedback equalization circuit.

BACKGROUND

As the information transmission rate continues to increase, the bandwidth problem becomes increasingly prominent. PAM4 (4-level Pulse Amplitude Modulation) signal has become one of the effective methods to solve this problem in replace of a conventional NRZ signal. Moreover, the end of Moore's Law will increase the demand and use of SerDes chiplet for meeting chip power and performance requirements of applications such as high-performance computing processors, high-performance AI computing, and Internet of Things/wireless edge. In the whole chiplet interface link, the equalization technology effectively compensates for the high-frequency attenuated signal caused by the chiplet interconnected channel. The receiving-end equalizer is important especially in a transmission channel with severe trailing.

The inventors have realized that a conventional PAM4 DFE circuit structure includes 3 decision devices, 3 delay units, and 1 thermometer decoder. The conventional PAM4 DFE has a simple structure, low circuit complexity, and low power consumption, but enables only one-tap coefficient compensation, which may greatly worsen the link transmission quality and bit error performance, making it unsuitable for transmission channels with severe trailing. Meanwhile, the circuit structure has no adaptive function and cannot automatically track and compensate for changes of channel characteristics. Therefore, the conventional circuit is greatly limited in application.

SUMMARY

Embodiments of the present application provide an adaptive PAM4 decision feedback equalization circuit. The circuit includes a decision feedback equalization main circuit and an adaptive circuit, where the main circuit includes an adder, a first decision device, a second decision device, a third decision device, a first delay unit group, a second delay unit group, a third delay unit group, a decoder, and a DSP coefficient table; each delay unit group is formed by i delay units connected in series; an input signal is connected to an input of the adder; an output of the adder is connected to inputs of the first decision device, the second decision device, and the third decision device, separately; outputs of the first decision device, the second decision device, and the third decision device are connected to inputs of the first delay unit group, the second delay unit group, and the third delay unit group, respectively; outputs of the first delay unit group, the second delay unit group, and the third delay unit group are connected to an input of the decoder, separately; the input of each delay unit is connected to an input of a tap coefficient unit; outputs of 31 tap coefficient units are connected to an input of the DSP coefficient table; an output of the DSP coefficient table is connected to the input of the adder; a composite signal of the input signal with a feedback signal of the DSP coefficient table after passing through the adder is input to the adaptive circuit; an output of the adaptive circuit is connected to the DSP coefficient table to adjust tap coefficients in the DSP coefficient table, I being an integer greater than one.

In some embodiments, the first decision device and the first delay unit group form a first decision path, the second decision device and the second delay unit group form a second decision path, the third decision device and the third delay unit group form a third decision path, and three tap coefficient units corresponding to three delay units at the same position in the first decision path, the second decision path, and the third decision path use the same tap coefficient.

In some embodiments, the DSP coefficient table is used to store tap coefficients and to implement multiplication and addition functions of decision signals and tap coefficients.

In some embodiments, for the composite signal $$x, V_x = V_{in} - V_{fed},$$

and $$V_{fed} = \sum V_{t,i} * c_i + \sum V_{m,i} * c_i + \sum V_{b,i} * c_i,$$

where $V_{in}$ is a level of the input signal in, $V_{t,i}$ is a level of a decision signal corresponding to an i-th delay unit in the first decision path, $V_{m,i}$ is a level of a decision signal corresponding to an i-th delay unit in the second decision path, $V_{b,i}$ is a level of a decision signal corresponding to an i-th delay unit in the third decision path, and $c_i$ is a tap coefficient corresponding to an i-th tap.

In some embodiments, the tap coefficients are obtained by using a look-up table and are controlled by an amplitude of the composite signal.

In some embodiments, the adaptive circuit includes an eye pattern monitoring module and an adaptive module, where the adaptive module includes a comparison unit, a delay unit, and a coefficient regulation and control unit; the composite signal x is connected to an input of the eye pattern monitoring module; an output of the eye pattern monitoring module is connected to an input of the comparison unit and an input of the delay unit, separately; another input of the comparison unit is connected to a reference value $D_{ref}$; an output of the comparison unit and an output of the delay unit are connected to an input of the coefficient regulation and control unit, separately; and an output of the coefficient regulation and control unit is connected to the DSP coefficient table.

In some embodiments, the eye pattern monitoring module detects a time length between adjacent zero crossing points and a level difference of intermediate samples separately by using a zero-crossing circuit and a central sampling circuit, and outputs $D_q$.

In some embodiments, the comparison unit implements a calculation of a difference $\Delta$ between $D_q$ of a current period and the reference value $D_{ref}$.

In some embodiments, a sign of the difference $\Delta$ represents a coefficient adjustment direction of the coefficient regulation and control unit, and an absolute value of the difference $\Delta$ and $D_q$ jointly determine an adjustment magnitude.

In some embodiments, the adaptive adjustment is implemented based on eye pattern monitoring and an adaptive algorithm, where the adaptive algorithm adopts a least mean square (LMS) algorithm.

Coefficients in the LMS algorithm are updated as follows:

$$C_i(n+T) = C_i(n) + 2\mu \cdot e(n) \cdot x(n)$$

where n is a currently adopted moment, T is a sampling period, e(n) is an error signal, x(n) is an equalization signal, and $\mu$ is a time constant.

After integral transformation, division by T, and transposition, the following formula is obtained:

$$\frac{C_i(n+T) - C_i(n)}{T} = \frac{2\mu}{T} e(n)x(n)$$

As T approaches zero, the tap coefficient $C_i(n)$ might be expressed as, according to the calculus definition:

$$C_i(n) = \frac{1}{\tau_{int}} \int_0^t e(n)x(n)dn$$

where $$\tau_{int} = T/2\mu$$

is a time constant of an integrator.

The details of one or more embodiments of the present application are set forth in the drawings and description below. Other features and advantages of the present application will be apparent from the description, drawings, and claims.

BRIEF DESCRIPTION OF THE DRAWINGS

In order to illustrate the technical schemes in the embodiments of the present application more clearly, the following briefly introduces the accompanying drawings required for describing the embodiments. Apparently, the accompanying drawings in the following description show only some embodiments of the present application, and a person of ordinary skill in the art may still derive other drawings from these accompanying drawings without creative efforts.

DETAILED DESCRIPTION

In order to make the objects, technical schemes, and advantages of the present application clearer, the present application will be further illustrated in detail below with reference to the drawings and embodiments. It is to be understood that the particular embodiments described herein are illustrative only and are not intended to limit the present application.

Figure 1:
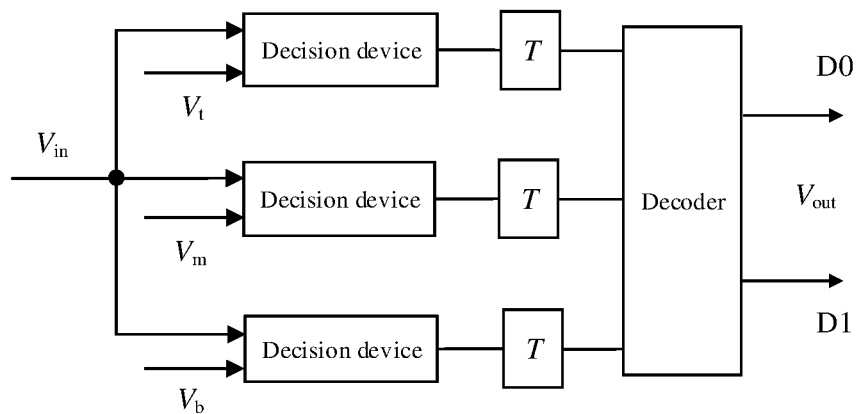
FIG. 1 is a schematic diagram of a conventional PAM4 decision feedback equalization circuit structure.

As shown in FIG. 1, a schematic diagram of a conventional PAM4 decision feedback equalization (DFE) circuit structure is shown.

The conventional PAM4 DFE circuit structure includes 3 decision devices, 3 delay units, and 1 thermometer decoder. $V_{in}$ is a level of the input signal in, $V_t$, $V_m$, and $V_b$ are three decision levels of the decision devices, T represents a delay unit and is delayed by one symbol period, and D0 and D1 are two bits in the output signal "out" of the decoder. The relationship between the PAM4 signal level and the decision level is shown in Table 1:

TABLE 1

| PAM4 signal level | Decision level | |
|---|---|---|
| 1 | 2/3 | $V_t$ |
| 1/3 | 0 | $V_m$ |
| −1/3 | −2/3 | $V_b$ |
| −1 | | | where $V_t$ is 2/3 for deciding the PAM4 signal levels "1" and "1/3"; $V_m$ is 0 for deciding the PAM4 signal levels "1/3" and "4/3"; and $V_b$ is −2/3 for deciding the PAM4 signal levels "−1/3" and "−1".

The comparison of the input signal level $V_{in}$ with the decision levels is as follows.

The input signal $V_{in}$ is compared with three levels to obtain a 3-bit decided output signal group. For example, when the input signal level $V_{in}$ is higher than $V_t$, the upper, middle, and lower decision devices each output a "1" signal, thus forming a 3-bit "111" output signal.

The 3-bit decided output signal is then decoded according to the thermometer code rule, and a 2-bit NRZ (Non-Return-to-Zero) signal is output.

The conventional PAM4 DFE has a simple structure, low circuit complexity, and low power consumption, but enables only one-tap coefficient compensation, making it unsuitable for transmission channels with severe trailing. Meanwhile, the circuit structure has no adaptive function and cannot automatically track and compensate for changes of channel characteristics.

The present application designs a high-speed adaptive PAM4 DFE circuit in a chiplet interconnected interface based on eye pattern monitoring and DSP technology.

The main inventive concepts are as follows.

1. In the decision path of each decision device, a plurality of delay units form a plurality of feedback paths. The data passes through the delay units in every clock period. When there are i taps in total, the output signal $V_{t,i}$ of the decision device is transmitted to $V_{t,i}$ after i periods.

2. Feedback paths corresponding to delay units at the same position in the decision paths of the upper, middle, and lower decision devices form a feedback path group. For example, $V_{t,1}$, $V_{m,1}$, and $V_{b,1}$ form a group, and the feedback paths in the group use the same tap coefficient.

3. The tap coefficients in the feedback paths are obtained by using a look-up table and are controlled by amplitudes of transmission signals so as to realize the multiplication function and the superposition function of the transmission signals with the coefficients.

4. The adaptive circuit receives the compensated signal x, and detects an eye width and an eye height or calculate a weighted sum thereof by using a zero crossing circuit and a central sampling circuit, separately.

The DFE main circuit uses a plurality of delay units to form a plurality of feedback paths to realize multi-tap coefficient compensation, and the tap coefficients in the DSP are selected by the transmission signals in the feedback paths. Eye pattern monitoring updates the tap coefficients with the eye height/eye width or the weighted sum thereof, requiring a determination of the difference between the eye height/eye width in the current period and the ideal value. As the eye height/eye width or the weighted sum thereof the eye pattern monitoring is within a range, the difference calculated in the adaptive algorithm is within a small range, the tap coefficients become stable, and the equalization effect is maximized.

In some embodiments, an adaptive PAM4 decision feedback equalization (DFE) circuit is provided, including a decision feedback equalization main circuit and an adaptive circuit, where the main circuit includes an adder, a first decision device, a second decision device, a third decision device, a first delay unit group, a second delay unit group, a third delay unit group, a decoder, and a DSP coefficient table; each delay unit group is formed by I delay units connected in series; an input signal is connected to an input of the adder; an output of the adder is connected to inputs of the first decision device, the second decision device, and the third decision device, separately; outputs of the first decision device, the second decision device, and the third decision device are connected to inputs of the first delay unit group, the second delay unit group, and the third delay unit group, respectively; outputs of the first delay unit group, the second delay unit group, and the third delay unit group are connected to an input of the decoder, separately; the input of each delay unit is connected to an input of a tap coefficient unit; outputs of 3I tap coefficient units are connected to an input of the DSP coefficient table; an output of the DSP coefficient table is connected to the input of the adder; a composite signal of the input signal with a feedback signal of the DSP coefficient table after passing through the adder is input to the adaptive circuit; an output of the adaptive circuit is connected to the DSP coefficient table to adjust tap coefficients in the DSP coefficient table, I being an integer greater than one.

Figure 2:
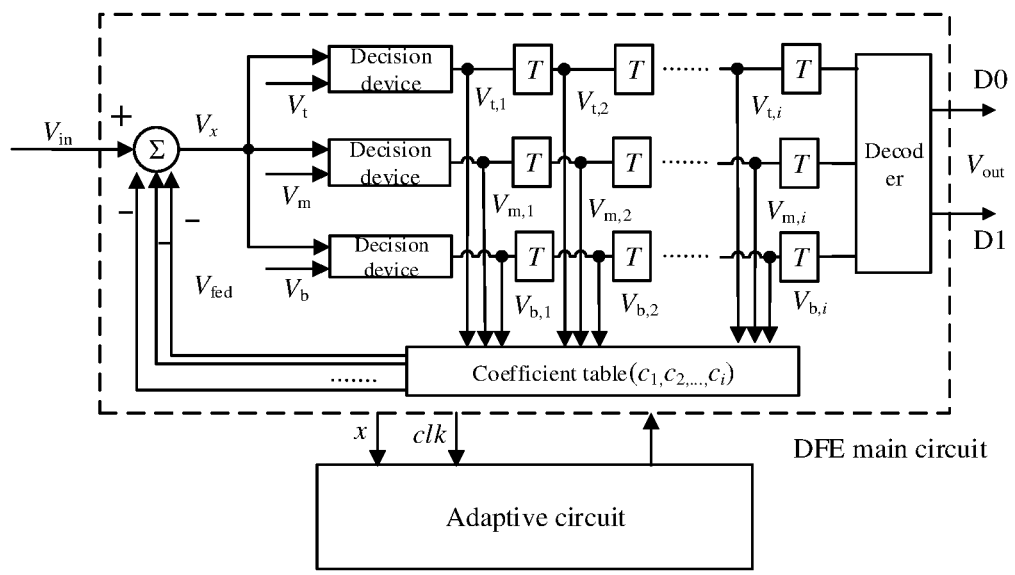
FIG. 2 is a schematic diagram of an overall architecture of an adaptive PAM4 decision feedback equalization circuit according to one or more embodiments in the present application.

In some embodiments, as shown in FIG. 2, the DFE main circuit module includes modules such as an adder, 3 decision devices, 3*I delay units, a thermometer decoder, and a DSP coefficient table.

The adder enables weighting of the input signal with a feedback compensation signal.

The decision devices enable level decision of the input signal.

The thermometer decoder realizes a 3b-2b decoding function.

The DSP coefficient table stores tap coefficients and implements multiplication and addition functions of decision signals and coefficients.

In some embodiments, the first decision device and the first delay unit group form a first decision path, the second decision device and the second delay unit group form a second decision path, the third decision device and the third delay unit group form a third decision path, and three tap coefficient units corresponding to three delay units at the same position in the first decision path, the second decision path, and the third decision path use the same tap coefficient.

In some embodiments, $V_t$ decision device and I delay units T form a $V_t$ decision path, $V_m$ decision device and I delay units T form a $V_m$ decision path, and $V_b$ decision device and I delay units T form a $V_b$ decision path.

$[V_{t,1}, V_{m,1},$ and $V_{b,1}]$ use the same tap coefficient, $[V_{t,1}, V_{m,1},$ and $V_{b,1}]$ use the same tap coefficient, and so on.

Different $[V_{t,1}, V_{m,1},$ and $V_{b,1}]$ combinations have unique tap coefficients.

In some embodiments, the DSP coefficient table is used to store tap coefficients and to implement multiplication and addition functions of decision signals and tap coefficients.

In some embodiments, the DSP coefficient table stores tap coefficients and implements multiplication and addition functions of decision signals and coefficients.

In some embodiments, for the composite signal $$x, V_x = V_{in} - V_{fed},$$

and $$V_{fed} = \sum V_{t,i} * c_i + \sum V_{m,i} * c_i + \sum V_{b,i} * c_i,$$

where $V_{in}$ is a level of the input signal in, $V_{t,i}$ is a level of a decision signal corresponding to an i-th delay unit in the first decision path, $V_{m,i}$ is a level of a decision signal corresponding to an i-th delay unit in the second decision path, $V_{b,i}$ is a level of a decision signal corresponding to an i-th delay unit in the third decision path, and $c_i$ is a tap coefficient corresponding to an i-th tap.

In some embodiments, for the input signal $V_{in}$ passing through the decision devices, there are four cases of $V_{t,1}$, $V_{m,1}$, and $V_{b,1}$, as shown in Table 2:

TABLE 2

| Range of the input signal $V_{in}$ | $V_{t,1}$ | $V_{m,1}$ | $V_{b,1}$ | $V_{fed}$ |
|---|---|---|---|---|
| $V_{in} > V_t (=2/3)$ | 1 | 1 | 1 | $3c_1$ |
| $V_t > V_{in} > V_m (=0)$ | 0 | 1 | 1 | $c_1$ |
| $V_t > V_m > V_{in} > V_b (=-2/3)$ | 0 | 0 | 1 | $-c_1$ |
| $V_t > V_m > V_b > V_{in}$ | 0 | 0 | 0 | $-3c_1$ | where 1 and 0 represent decided levels, with tap coefficients $c_i$ and $-c_i$ being separately selected.

$$x, V_x = V_{in} - V_{fed} = V_{in} - \sum V_{t,i} * c_i - \sum V_{m,i} * c_i - \sum V_{b,i} * c_i.$$

For the decided signal $$V_{fed} = \sum V_{t,i} * c_i + \sum V_{m,i} * c_i + \sum V_{b,i} * c_i.$$

That is,

For example, if the input V m is 0.3, which is greater than 0 and less than 2/3, and $V_{fed}$ is 0, $V_{t,1}$=0, $V_{m,1}$ and $V_{b,1}$ are 1, and then V fed is C1.

If $c_i$ is 0.1 and $V_{in}$ for a next period is 0.7, $V_x$=0.6, which is greater than 0 and less than 2/3, and then $V_{t,1}$=0, $V_{m,1}$ and $V_{b,1}$ are 1.

If $V_{in}$ for a next period is −0.6, $V_x$=−0.7, which is less than −2/3, and then $V_{t,1}$, $V_{m,1}$, and $V_{b,1}$ are 0, and $V_{fed}$ is −3$c_1$.

$V_{fed}$ is further fed back to $V_{in}$ for a next period.

In some embodiments, the tap coefficients are obtained by using a look-up table and are controlled by an amplitude of the composite signal.

When an initial level of the feedback compensation signal $V_{fed}$ is 0, the output signal $V_x$ of the adder is equal to the input signal $V_{in}$. $V_x$ undergoes decision of three decision devices. If $V_x$ is higher than the decision level, the decision devices output a high level "1", and if $V_x$ is lower than the decision level, the decision devices output a low level "0", forming initial 3-bit data [$V_{t,1}$, $V_{m,1}$, $V_{b,1}$]. Data is continuously sampled and transmitted in every clock period. After j clock periods (j≤i), the output data of j-th delay units is [$V_{t,j}$, $V_{m,j}$, $V_{b,j}$].

Then, when the data $V_{in}$ is transmitted for a next moment, the feedback compensation signal is also updated, which is obtained through looking up in the DSP coefficient table by the output signal of the delay units. For example, when the output signal [$V_{t,j}$, $V_{m,j}$, $V_{b,j}$] of the delay units is "111", the DSP coefficient table outputs 3$c_j$. Then, the output signal of the adder $V_x$=$V_{in}$−$V_{fed}$. The first step is repeated for multiple times until the difference Δ substantially stabilizes in the adaptive circuit.

Finally, the DSP coefficient table continuously updates the coefficients based on the adaptive circuit, and the feedback compensation signal Vied is also continuously updated.

In some embodiments, the adaptive circuit includes an eye pattern monitoring module and an adaptive module, where the adaptive module includes a comparison unit, a delay unit, and a coefficient regulation and control unit; the composite signal x is connected to an input of the eye pattern monitoring module; an output of the eye pattern monitoring module is connected to an input of the comparison unit and an input of the delay unit, separately; another input of the comparison unit is connected to a reference value $D_{ref}$; an output of the comparison unit and an output of the delay unit are connected to an input of the coefficient regulation and control unit, separately; and an output of the coefficient regulation and control unit is connected to the DSP coefficient table.

In some embodiments, the eye pattern monitoring module detects a time length between adjacent zero crossing points and a level difference of intermediate samples separately by using a zero-crossing circuit and a central sampling circuit, and outputs $D_q$.

In some embodiments, the comparison unit implements a calculation of a difference Δ between $D_q$ of a current period and the reference value $D_{ref}$.

In some embodiments, a sign of the difference Δ represents a coefficient adjustment direction of the coefficient regulation and control unit, and an absolute value of the difference Δ and $D_q$ jointly determine an adjustment magnitude.

Figure 3:
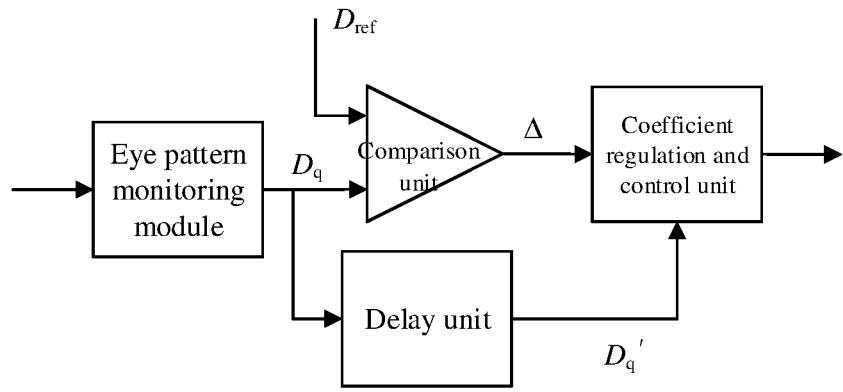
FIG. 3 is a schematic diagram of an architecture of an adaptive circuit according to one or more embodiments in the present application.

In some embodiments, as shown in FIG. 3, the adaptive circuit includes an eye pattern monitoring module and an adaptive module, where the adaptive module is formed by a comparison unit, a delay unit, and a coefficient regulation and control unit.

First, the eye pattern monitoring module detects a time length between adjacent zero crossing points and a level difference of intermediate samples, i.e., an eye width and an eye height, separately by using a zero-crossing circuit and a central sampling circuit, and outputs $D_q$.

Figure 4:
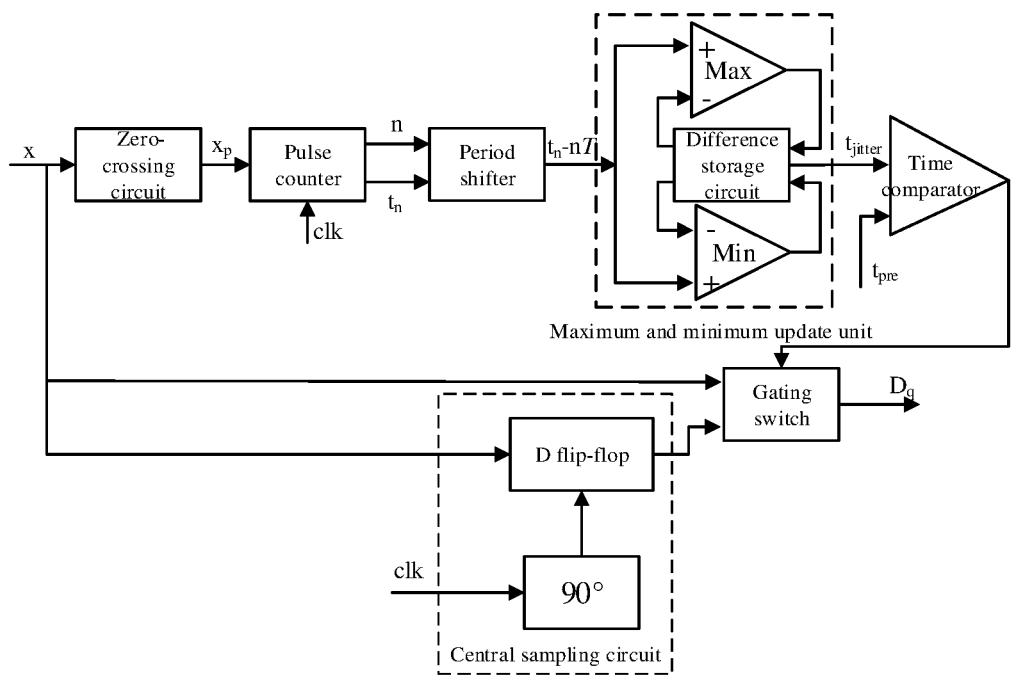
FIG. 4 is a schematic diagram of an architecture of an eye pattern monitoring module according to one or more embodiments in the present application.

In some embodiments, and with reference to FIG. 4, the eye pattern monitoring module includes a zero-crossing circuit, a pulse counter, a period shifter, a maximum and minimum update unit, a time comparator, a gating switch, a D flip-flop, and a 90 degree phase delay circuit, where the maximum and minimum update unit is formed by a maximum/minimum comparator and a difference storage circuit, and the difference storage circuit is implemented by an input/output snubber circuit (FIFO). First, the zero-crossing circuit is implemented based on switching characteristics of a transistor and outputs a single pulse signal $x_p$ at a zero position. The pulse counter records the number n and the time $t_n$ of pulses under the clock signal clk. The values are transmitted to the period shifter to calculate $t_n$-nT, i.e., the zero crossing time $t_n$ is shifted by n periods. The difference is then passed to the maximum and minimum update unit. Initially, the difference storage circuit defaults to zero, and after a number of maximum/minimum comparisons, the difference storage circuit outputs a maximum time jitter $t_{jitter}$. Finally, the time comparator compares the time jitter $t_{jitter}$ output by the maximum and minimum update unit with a preset time jitter $t_{pre}$. If $t_{jitter}$>$t_{pre}$, which indicates that the horizontal opening of the eye pattern does not meet the pre-set condition, the gating switch is off, and $D_q$ is adaptively optimized based on the horizontal opening, and the output signal of the D flip-flop will not be transmitted to $D_q$ at this time. If $t_{jitter}$<$t_{pre}$, which indicates that the horizontal opening of the eye pattern meets the pre-set condition, the gating switch is on. The central sampling circuit includes a D flip-flop and a 90-degree phase delay circuit. The D flip-flop samples the signal under the clock signal of the 90-degree phase delay circuit, and $D_q$ is adaptively optimized based on the vertical opening of the eye pattern, and the output signal of the D flip-flop will be transmitted to $D_q$ at this time.

The delay unit may be an inverter or a D flip-flop depending on the transmission structure of the circuit, and a delay unit formed by the inverter is used in short delay and also exerts actuating effect. The D flip-flop is associated with a clock signal and may form delayed signals delayed by 90, 180, and 270 degrees. In some embodiments, the delay unit employs a circuit configuration based on inverter cascade with an equal transmission time with the comparator.

Then, the comparison unit in the adaptive algorithm module is used to calculate a difference Δ between a current period and the ideal value $D_{ref}$. The comparison unit is implemented using a comparator.

Finally, a sign of the difference Δ represents a coefficient adjustment direction of the coefficient regulation and control module, and an absolute value and $D_q$ jointly determine an adjustment magnitude. The adjusted coefficients continuously update the coefficients in the DSP coefficient table.

This scheme might not only automatically track channel changes in real time, but also use DSP technology to achieve multi-tap compensation and low power consumption, among other demands.

In some embodiments, the adaptive adjustment is implemented based on eye pattern monitoring and an adaptive algorithm, where the adaptive algorithm adopts a least mean square (LMS) algorithm.

Coefficients in the LMS algorithm are updated as follows:

$$C_i(n+T) = C_i(n) + 2\mu \cdot e(n) \cdot x(n)$$

where n is a currently adopted moment, T is a sampling period, e(n) is an error signal, x(n) is an equalization signal, and μ is a time constant.

After integral transformation, division by T, and transposition, the following formula is obtained:

$$\frac{C_i(n+T) - C_i(n)}{T} = \frac{2\mu}{T} e(n)x(n)$$

As T approaches zero, the tap coefficient $C_i(n)$ might be expressed as, according to the calculus definition:

$$C_i(n) = \frac{1}{\tau_{int}} \int_0^\tau e(n)x(n)dn$$

where $$\tau_{int} = T/2\mu$$

is a time constant of an integrator.

Δ is e(n) and $D_q'$ is x(n). The coefficient regulation and control unit may be implemented by the integrator, outputting tap coefficients.

Eye pattern monitoring allows horizontal and vertical openings of the eye pattern to be sampled and estimated, resulting in $D_q$. An ideal vertical opening of each eye is 2/3 as compared with the reference value $D_{ref}$.

$D_q$ refers to an output the eye pattern monitoring on the signal x.

If $D_q$ is 0.5, and Δ is positive, the coefficient $c_i$ is to be reduced, and $V_{in}$-$V_{fed}$ is adjusted 2/3 upwards.

If $D_q$ is 0.7, and Δ is negative, the coefficient $c_i$ is to be increased, and $V_{in}$-$V_{fed}$ is adjusted 2/3 downwards.

The tap coefficients output by the coefficient regulation and control unit are fed back to the DSP coefficient table.

In the scheme of the present application, a high-speed adaptive multi-tap PAM4 DFE is designed based on CMOS process and DSP technology. The DSP technology replaces multipliers and adders in the DFE feedback loop and eliminates the design of the front-end circuit ADC, which effectively reduces power consumption and avoids the influence of ADC quantization noise on the signal. Besides, eye pattern monitoring and an adaptive algorithm achieve automatic coefficient update and broaden the application scope of DFE, making it fully applicable to C2C, D2D, and other chiplet interfaces.

The scheme of the present application combines DSP technology and the adaptive algorithm to enable a high-speed adaptive multi-tap PAM4 DFE in a chiplet interconnected interface, which greatly reduces power consumption. The coefficient update is realized by using a look-up table and eye pattern monitoring technology, which significantly expands the application scope and improves the reliability of transmission signals.

Various modules in the adaptive PAM4 decision feedback equalization (DFE) circuit may be implemented in whole or in part by software, hardware, and combinations thereof. The modules described above may be embedded in hardware or stored separately from a processor in a computer device, and may also be stored in a memory in the computer device in software, whereby the processor calls the modules to perform corresponding operations of the modules described above.

Various technical features of the embodiments above might be arbitrarily combined. In order to make the description concise, not all the possible combinations of the technical features in the embodiments above are described. However, the combinations of these technical features shall be considered as falling with the scope of the description as long as there is no contradiction therein.

The embodiments described above express only a few implementations of the present application which are described in detail and should not therefore be construed as limiting the scope of the present application. It is noted that a person of ordinary skill in the art would be able to make several variations and improvements without departing from the concept of the present application, which fall within the protection scope of the present application. Therefore, the protection scope of the present application shall be subject to the appended claims.

What is claimed is:

1. An adaptive 4-level Pulse Amplitude Modulation (PAM4) decision feedback equalization circuit, comprising a decision feedback equalization main circuit and an adaptive circuit,
   wherein the decision feedback equalization main circuit comprises an adder, a first decision device, a second decision device, a third decision device, a first delay unit group, a second delay unit group, a third delay unit group, a decoder, and a Digital Signal Processor (DSP) coefficient table;
   wherein each one of the first delay unit group, the second delay unit group and the third delay unit group is formed by I delay units connected in series;
   an input signal is connected to an input of the adder;
   an output of the adder is connected to inputs of the first decision device, the second decision device, and the third decision device, separately;
   outputs of the first decision device, the second decision device, and the third decision device are connected to inputs of the first delay unit group, the second delay unit group, and the third delay unit group, respectively;
   outputs of the first delay unit group, the second delay unit group, and the third delay unit group are connected to an input of the decoder, separately;
   the input of each one of the first delay unit group, the second delay unit group and the third delay unit group is connected to an input of a tap coefficient unit;
   outputs of 31 tap coefficient units comprising the tap coefficient unit are connected to an input of the DSP coefficient table;
   an output of the DSP coefficient table is connected to the input of the adder;
   a composite signal of the input signal with a feedback signal of the DSP coefficient table after passing through the adder is input to the adaptive circuit; and
   an output of the adaptive circuit is connected to the DSP coefficient table to adjust tap coefficients in the DSP coefficient table, wherein I is an integer greater than one.

2. The adaptive PAM4 decision feedback equalization circuit according to claim 1, wherein the first decision device and the first delay unit group form a first decision path, the second decision device and the second delay unit group form a second decision path, the third decision device and the third delay unit group form a third decision path, and three tap coefficient units corresponding to three delay units at a same position in the first decision path, the second decision path, and the third decision path use a same tap coefficient.

3. The adaptive PAM4 decision feedback equalization circuit according to claim 2, wherein the DSP coefficient table is used to store tap coefficients and to implement multiplication and addition functions of decision signals and tap coefficients.

4. The adaptive PAM4 decision feedback equalization circuit according to claim 3, wherein for the composite signal $$x, V_x = V_{in} - V_{fed}, \text{ and } V_{fed} = \sum V_{t,i}^* c_i + \sum V_{m,i}^* c_i + \sum V_{b,i}^* c_i,$$

wherein $V_{in}$ is a level of the input signal in, $V_{t,i}$ is a level of a decision signal corresponding to an i-th delay unit in the first decision path, $V_{m,i}$ is a level of a decision signal corresponding to an i-th delay unit in the second decision path, $V_{b,i}$ is a level of a decision signal corresponding to an i-th delay unit in the third decision path, $c_i$ is a tap coefficient corresponding to an i-th tap coefficient unit, and i is a specified number among I.

5. The adaptive PAM4 decision feedback equalization circuit according to claim 4, wherein the tap coefficients are obtained by using a look-up table method and are controlled by an amplitude of the composite signal.

6. The adaptive PAM4 decision feedback equalization circuit according to claim 2, wherein the adaptive circuit comprises an eye pattern monitoring module and an adaptive module;
wherein the adaptive module comprises a comparison unit, a delay unit, and a coefficient regulation and control unit;
the composite signal x is connected to an input of the eye pattern monitoring module; an output of the eye pattern monitoring module is connected to a first input of the comparison unit and an input of the delay unit, separately; a second input of the comparison unit is connected to a reference value D ref; an output of the comparison unit and an output of the delay unit are connected to an input of the coefficient regulation and control unit, separately; and an output of the coefficient regulation and control unit is connected to the DSP coefficient table.

7. The adaptive PAM4 decision feedback equalization circuit according to claim 3, wherein the adaptive circuit comprises an eye pattern monitoring module and an adaptive module;
wherein the adaptive module comprises a comparison unit, a delay unit, and a coefficient regulation and control unit;
the composite signal x is connected to an input of the eye pattern monitoring module; an output of the eye pattern monitoring module is connected to a first input of the comparison unit and an input of the delay unit, separately; a second input of the comparison unit is connected to a reference value $D_{ref}$; an output of the comparison unit and an output of the delay unit are connected to an input of the coefficient regulation and control unit, separately; and an output of the coefficient regulation and control unit is connected to the DSP coefficient table.

8. The adaptive PAM4 decision feedback equalization circuit according to claim 4, wherein the adaptive circuit comprises an eye pattern monitoring module and an adaptive module;
wherein the adaptive module comprises a comparison unit, a delay unit, and a coefficient regulation and control unit;
the composite signal x is connected to an input of the eye pattern monitoring module; an output of the eye pattern monitoring module is connected to a first input of the comparison unit and an input of the delay unit, separately; a second input of the comparison unit is connected to a reference value $D_{ref}$; an output of the comparison unit and an output of the delay unit are connected to an input of the coefficient regulation and control unit, separately; and an output of the coefficient regulation and control unit is connected to the DSP coefficient table.

9. The adaptive PAM4 decision feedback equalization circuit according to claim 5, wherein the adaptive circuit comprises an eye pattern monitoring module and an adaptive module;
wherein the adaptive module comprises a comparison unit, a delay unit, and a coefficient regulation and control unit;
the composite signal x is connected to an input of the eye pattern monitoring module; an output of the eye pattern monitoring module is connected to a first input of the comparison unit and an input of the delay unit, separately; a second input of the comparison unit is connected to a reference value D ref; an output of the comparison unit and an output of the delay unit are connected to an input of the coefficient regulation and control unit, separately; and an output of the coefficient regulation and control unit is connected to the DSP coefficient table.

10. The adaptive PAM4 decision feedback equalization circuit according to claim 1, wherein the adaptive circuit comprises an eye pattern monitoring module and an adaptive module;
wherein the adaptive module comprises a comparison unit, a delay unit, and a coefficient regulation and control unit;
the composite signal x is connected to an input of the eye pattern monitoring module; an output of the eye pattern monitoring module is connected to a first input of the comparison unit and an input of the delay unit, separately; a second input of the comparison unit is connected to a reference value D ref; an output of the comparison unit and an output of the delay unit are connected to an input of the coefficient regulation and control unit, separately; and an output of the coefficient regulation and control unit is connected to the DSP coefficient table.

11. The adaptive PAM4 decision feedback equalization circuit according to claim 10, wherein an adaptive adjustment of the adaptive PAM4 decision feedback equalization circuit is implemented based on eye pattern monitoring and an adaptive algorithm, wherein the adaptive algorithm is a least mean square (LMS) algorithm, and coefficients in the LMS algorithm are updated as follows:

$$C_i(n+T) = C_i(n) + 2\mu \cdot e(n) \cdot x(n)$$

wherein n is a currently sampling moment, T is a sampling period, e (n) is an error signal, x(n) is an equalization signal, and μ is a time constant,
after integral transformation, division by T, and transposition, the following formula is obtained:

$$\frac{C_i(n+T) - C_i(n)}{T} = \frac{2\mu}{T} e(n)x(n)$$

as T approaches zero, the tap coefficient $C_i(n)$ is expressed as, according to the calculus definition:

$$C_i(n) = \frac{1}{\tau_{int}} \int_0^\tau e(n)x(n)dn$$

wherein $$\tau_{int} = T/2\mu$$

is a time constant of an integrator.

12. The adaptive PAM4 decision feedback equalization circuit according to claim 10, wherein the comparison unit comprises a comparator.

13. The adaptive PAM4 decision feedback equalization circuit according to claim 10, wherein the coefficient regulation and control unit comprises an integrator, and is configured to output a regulated tap coefficient.

14. The adaptive PAM4 decision feedback equalization circuit according to claim 10, wherein the eye pattern monitoring module detects a time length between adjacent zero crossing points and a level difference of intermediate samples separately by using a zero-crossing circuit and a central sampling circuit, and outputs $D_q$.

15. The adaptive PAM4 decision feedback equalization circuit according to claim 14, wherein the coefficient regulation and control unit comprises an integrator, and is configured to output a regulated tap coefficient.

16. The adaptive PAM4 decision feedback equalization circuit according to claim 14, wherein the comparison unit is configured to implement a calculation of a difference Δ between $D_q$ of a current period and the reference value $D_{ref}$.

17. The adaptive PAM4 decision feedback equalization circuit according to claim 16, wherein a sign of the difference Δ represents a coefficient adjustment direction of the coefficient regulation and control unit, and an absolute value of the difference Δ and $D_q$ jointly determine an adjustment magnitude.

18. The adaptive PAM4 decision feedback equalization circuit according to claim 17, wherein the coefficient regulation and control unit is configured to:
when the difference Δ is positive, reduce a tap coefficient, and
when the difference Δ is positive, increase a tap coefficient.

19. The adaptive PAM4 decision feedback equalization circuit according to claim 1, the DSP coefficient table is used to store tap coefficients and to implement multiplication and addition functions of decision signals and tap coefficients.

20. The adaptive PAM4 decision feedback equalization circuit according to claim 1, wherein an adaptive adjustment of the adaptive PAM4 decision feedback equalization circuit is implemented based on eye pattern monitoring and an adaptive algorithm, wherein the adaptive algorithm is a least mean square (LMS) algorithm, and
coefficients in the LMS algorithm are updated as follows:

$$C_i(n+T) = C_i(n) + 2\mu \cdot e(n) \cdot x(n)$$

wherein n is a currently sampling moment, T is a sampling period, e(n) is an error signal, x(n) is an equalization signal, and μ is a time constant,
after integral transformation, division by T, and transposition, the following formula is obtained:

$$\frac{C_i(n+T) - C_i(n)}{T} = \frac{2\mu}{T} e(n)x(n)$$

as T approaches zero, the tap coefficient $C_i(n)$ is expressed as, according to the calculus definition:

$$C_i(n) = \frac{1}{\tau_{int}} \int_0^\tau e(n)x(n)dn$$

wherein $$\tau_{int} = T/2\mu$$

is a time constant of an integrator.

* * * * *